(No Model.)
J. C. HOCHHAUS.
SPROCKET WHEEL AND CHAIN.
No. 554,272. Patented Feb. 11, 1896.
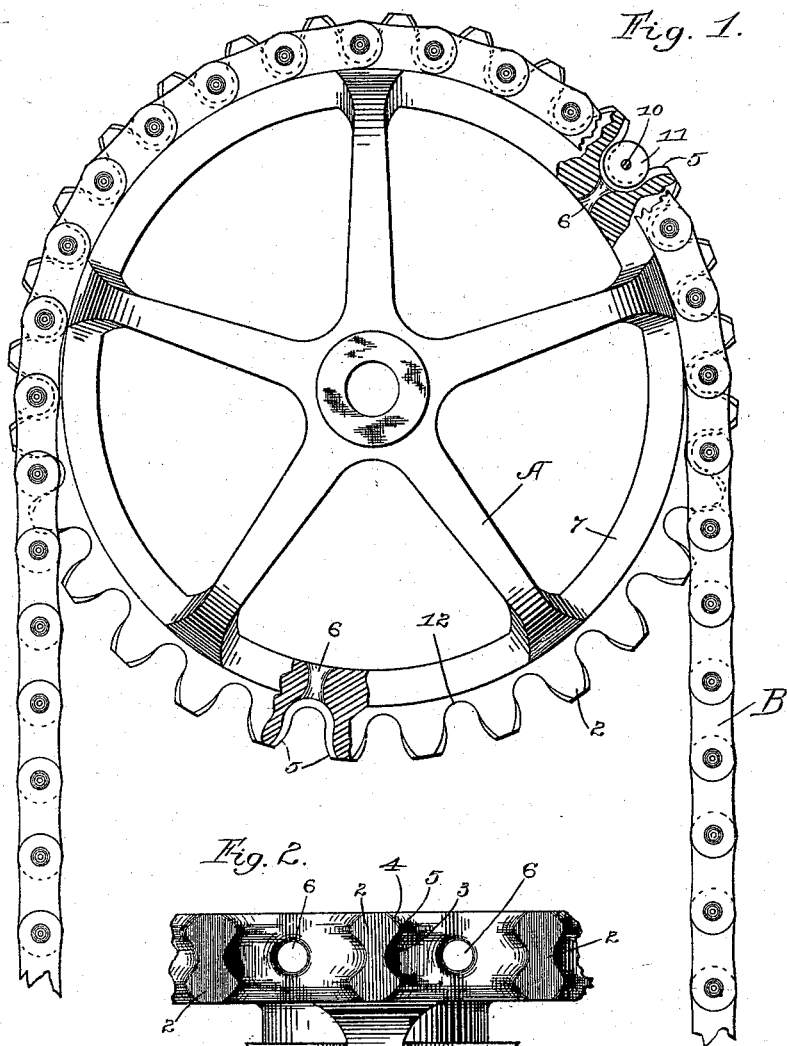
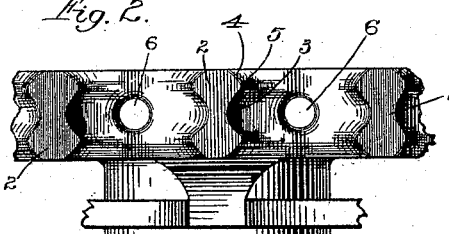
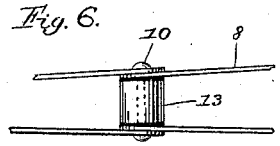
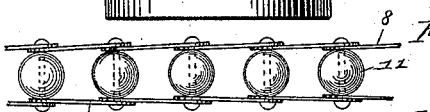
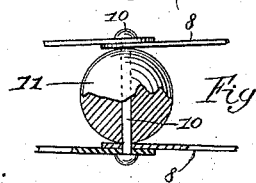
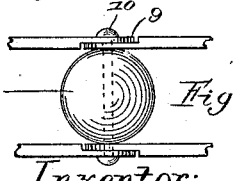
Witnesses:
V. F. Bradbury.
Minnie L. Thauwald.
Inventor:
John C. Hochhaus.
per: V. D. Merwin
Attorney.

UNITED STATES PATENT OFFICE.

JOHN C. HOCHHAUS, OF ST. PAUL, MINNESOTA.

SPROCKET WHEEL AND CHAIN.

SPECIFICATION forming part of Letters Patent No. 554,272, dated February 11, 1896.

Application filed August 12, 1895. Serial No. 558,955. (No model.)

*To all whom it may concern:*

Be it known that I, JOHN C. HOCHHAUS, of St. Paul, Ramsey county, Minnesota, have invented certain Improvements in Sprocket Wheels and Chains, of which the following is a specification.

My invention relates to improvements in sprocket-wheels and link belts for use with the same, its object being to provide an improved construction by means of which all friction between the chain and wheel is practically eliminated, and any dirt or other foreign matter which may fall upon the wheel will be freed from it, so as not to interfere with the chain and thereby cause friction.

To this end my invention consists in channeling the face of the teeth of the wheel and forming an opening through the rim of the wheel between the teeth, so that the members of the chain (which are greater in width than the width of the channels) will bear upon the edges of the channel or groove and any dirt or foreign substance which may have fallen upon the teeth will be crowded into the channel or through the opening in the rim of the wheel, thus removing it as an obstruction to the chain.

My invention further consists in the specific features of construction hereinafter more particularly described and claimed.

In the accompanying drawings, forming part of this specification, Figure 1 is a plan view, partly broken away, of my improved sprocket-wheel, with a section of the chain shown in engagement therewith. Fig. 2 is a detail plan view of the face of the wheel, showing the construction of the teeth. Fig. 3 is a detail of the chain. Fig. 4 is an enlarged detail, partially broken away, of one of the anti-friction-balls of the chain. Fig. 5 is a detail of a modified construction of chain; and Fig. 6 is a detail of another modified construction of chain, provided with cylindrical rolls instead of balls journaled upon its cross-bars.

In the drawings, the wheel A has its teeth 2 provided with the preferably rounded channels 3, the outer edges 4 of the teeth being also rounded off to form two knife-edges 5 upon the face of the teeth. Intermediate of the teeth a hole 6 is drilled through the rim or felly of the wheel. The chain B is formed with the straight side bars or links 8 overlapping each other, as in the step form shown in Fig. 3, or having their ends formed with rabbets 9, as shown in Fig. 5, so that the bodies of the links may be in alignment when connected. The overlapping ends of the adjacent links and the opposite bars are connected by means of the pivot-pins 10, on which is journaled the ball 11. This ball is of such size as to fit accurately into the bottom 12 of the notch between the teeth of the wheel. In the modified construction shown in Fig. 6 the antifriction-roll 13 serves substantially, although less satisfactorily in most cases, the function of the ball 11, bearing upon the edges of the teeth and fitting into the recess 12. It will thus be seen that the belt in slipping on and off the wheel in operation is relieved almost entirely of friction by means of the ball 11 or roll 13, which rolls up and down upon the edges 5 of the teeth, and any dirt which may have accumulated upon the teeth is crowded into the channel 3 or into the hole 6 out of the way of the chain instead of remaining between the teeth as an obstacle to the chain. This construction of wheel and chain is of special value in bicycles to reduce the friction between the parts to the minimum and to clear the wheel of any sand or dirt which drops upon it from the carrying-wheel.

I claim—

1. A sprocket-wheel having the face of each tooth formed with a pair of longitudinal knife-edges, and having openings through the felly between the opposite pairs of knife-edges on adjacent teeth, substantially as described.

2. The combination with the sprocket-wheel, having its teeth longitudinally channeled, of a link belt therefor provided with antifriction members journaled upon the cross-bars, said members being greater in width than the width of said channels.

3. The combination of the sprocket-wheel having the faces of its teeth provided with knife-edge bearings and having openings through the felly between the teeth, and the link belt provided with antifriction members journaled upon the cross-bars, said members bearing against said knife-edge bearings, so that any dirt upon said members is freed therefrom by said bearings, and forced through said openings.

In testimony whereof I affix my signature in presence of two witnesses.

JOHN C. HOCHHAUS.

Witnesses:
T. D. MERWIN,
MINNIE L. THAUWALD.